United States Patent
Marty et al.

(10) Patent No.: US 8,685,148 B2
(45) Date of Patent: Apr. 1, 2014

(54) PROCESS FOR UTILIZING THE VENTED GAS MIXTURE FROM A DEAERATOR ASSOCIATED WITH A SYNGAS PRODUCTION UNIT AND PLANT FOR ITS IMPLEMENTATION

(75) Inventors: Pascal Marty, Bry sur Marne (FR); Marie-Pascal Victor, Paris (FR); Alain Briglia, Corze (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 190 days.

(21) Appl. No.: 13/139,076

(22) PCT Filed: Dec. 17, 2009

(86) PCT No.: PCT/FR2009/052583
§ 371 (c)(1),
(2), (4) Date: Jun. 10, 2011

(87) PCT Pub. No.: WO2010/072948
PCT Pub. Date: Jul. 1, 2010

(65) Prior Publication Data
US 2011/0239864 A1    Oct. 6, 2011

(30) Foreign Application Priority Data
Dec. 22, 2008  (FR) .................................. 08 58960

(51) Int. Cl.
*B01D 19/00* (2006.01)
(52) U.S. Cl.
USPC ................. 95/254; 95/264; 96/202; 422/609; 422/625; 422/629; 423/650; 48/128; 48/198.1; 48/198.3

(58) Field of Classification Search
None
See application file for complete search history.

(56) References Cited

U.S. PATENT DOCUMENTS

| | | | | |
|---|---|---|---|---|
| 3,726,239 | A * | 4/1973 | Burbach | 110/345 |
| 4,193,776 | A * | 3/1980 | Wasala et al. | 95/256 |
| 7,850,944 | B2 * | 12/2010 | Genkin et al. | 423/650 |
| 2003/0110694 | A1 * | 6/2003 | Drnevich et al. | 48/198.5 |
| 2005/0288381 | A1 | 12/2005 | Marrella et al. | |
| 2006/0057060 | A1 * | 3/2006 | Sun et al. | 423/651 |
| 2007/0149394 | A1 * | 6/2007 | Fan et al. | 502/304 |
| 2011/0005438 | A1 * | 1/2011 | Polster et al. | 110/215 |

FOREIGN PATENT DOCUMENTS

| | | |
|---|---|---|
| EP | 0349164 | 1/1990 |
| FR | 2418813 | 9/1979 |

OTHER PUBLICATIONS

PCT ISR for PCT/FR2009/052583.
PCT/FR2009/052583, Written Opinion of the International Searching Authority (8 pp).

* cited by examiner

*Primary Examiner* — Duane Smith
*Assistant Examiner* — Phillip Shao
(74) *Attorney, Agent, or Firm* — Justin K. Murray; Elwood L. Haynes

(57) ABSTRACT

The present invention relates to a process and a plant for the treatment of the vented gas mixture from a deaerator of a steam production process associated with a hydrocarbon-reforming syngas production process.

18 Claims, 1 Drawing Sheet

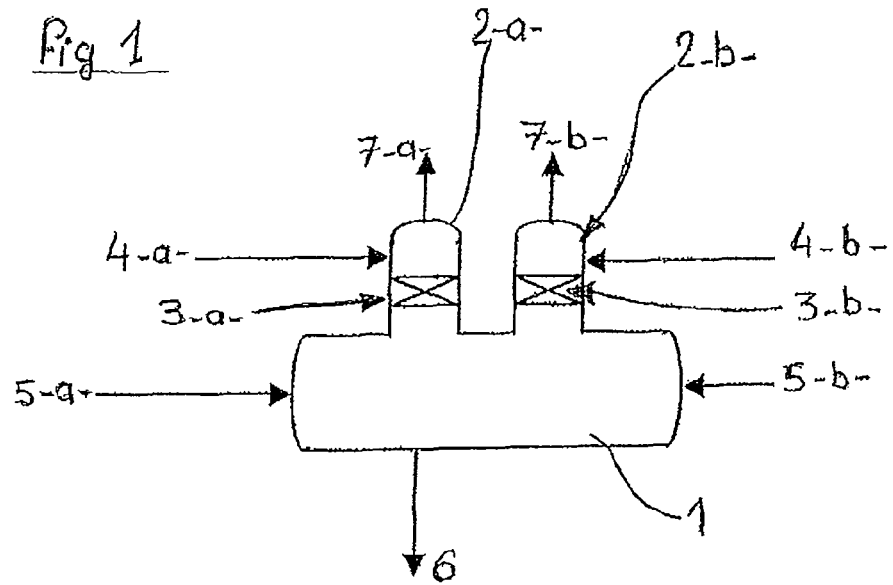
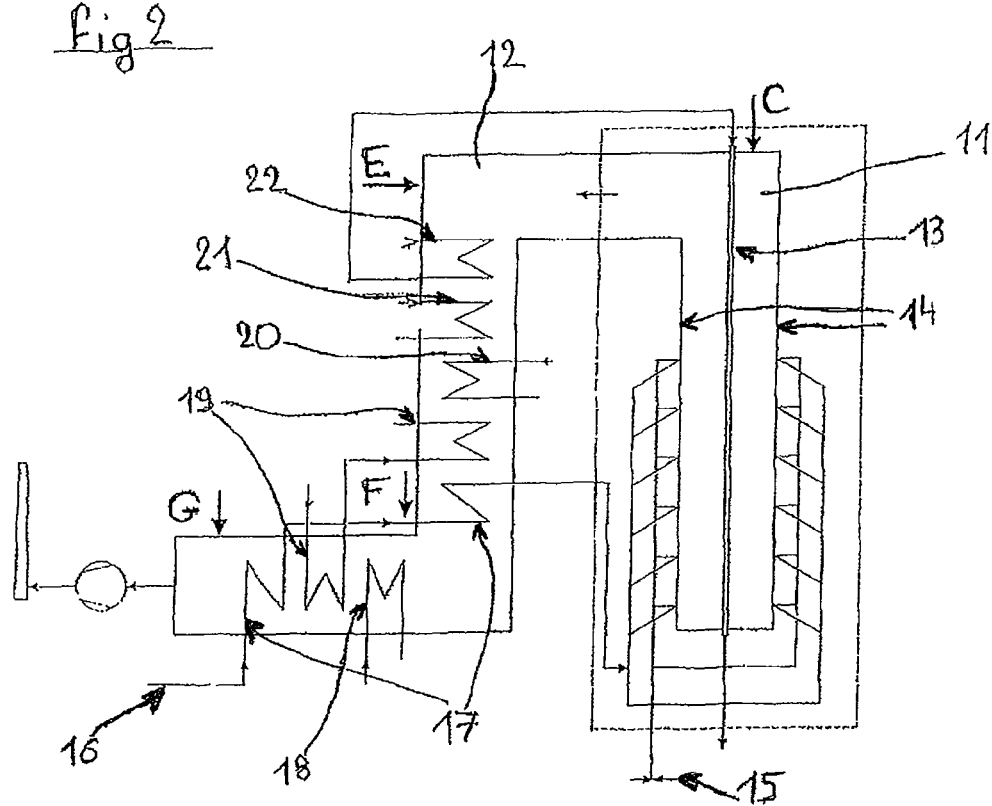

PROCESS FOR UTILIZING THE VENTED GAS MIXTURE FROM A DEAERATOR ASSOCIATED WITH A SYNGAS PRODUCTION UNIT AND PLANT FOR ITS IMPLEMENTATION

This application is a §371 of International PCT Application PCT/FR2009/052583, filed Dec. 17, 2009.

FIELD OF THE INVENTION

The present invention relates to a process and a plant for the treatment of the vented gas mixture from a deaerator of a steam production process associated with a hydrocarbon-reforming syngas production process.

BACKGROUND

The present invention relates in particular to a process for generating an $H_2/CO$ syngas by steam methane reforming (SMR) (or steam reforming with other hydrocarbon feedstocks such as naphtha, fuel oil, methanol, etc.) or by autothermal reforming (ATR).

Syngas production is in general associated with steam production which itself involves a deaeration process.

During syngas production, a gas mixture essentially containing hydrogen, carbon monoxide, carbon dioxide, water and methane is in fact generated, this mixture being called syngas.

The syngas may be produced by various methods. Mention may especially be made of steam methane reforming or SMR, autothermal reforming or ATR, non-catalytic or catalytic partial oxidation or POX, and reforming using a membrane catalytic reformer, these various syngas production methods being able to be combined with one another and/or combined with gas heated reforming or GHR. These methods may also be supplemented with a shift reaction intended to reduce the production of CO in favor of greater production of $H_2$ and $CO_2$. Whatever the method used, the syngas is produced at high temperature, generally between 600 and 1000° C.

During syngas generation, various types of reaction are involved, always at high temperature. Certain reactions are endothermic and require large amounts of heat, while others are exothermic, so that large amounts of heat are produced via the output fluids (syngas, flue gas).

Large amounts of heat must thus be removed both from the product obtained, i.e. the syngas, so as to lower its temperature sufficiently for it to be able to be treated, and from the combustion gas.

To utilize this available heat and to meet existing steam requirements on the site, or nearby, a syngas production unit is frequently combined with delivery of steam in variable amount as by-product.

This steam comes at least partly from the water contained in the syngas—also called process condensate—which is recovered and recycled. The steam may also be produced from water external to the process, in general demineralized water. The amount of heat delivered by the process is such that it makes it possible in general to produce a supplement of steam in relation to the requirements of the process. Thus, steam may be exported to one or more customers.

Often customers require high-quality steam, that is to say having low concentrations of impurities, for example dissolved gases such as oxygen, carbon dioxide, ammonia, etc. or liquid contaminants such as methanol, formic acid, amines, etc. This is in particular the case when the steam is intended to be exported away from the process.

In particular, water intended to be supplied to boilers must be deoxygenated in order to eliminate the dissolved oxygen present in amounts of the order of the saturation content (9 to 10 ppm) down to practically zero before it can be used in a boiler. This operation is necessary because of the corrosive behavior of oxygen on the metal components both in boilers and in pipes.

Moreover, during syngas production, side reactions also take place (for example, but not exclusively, during catalyzed steps) which generate impurities such as ammonia, methanol, formic acid and amines, which impurities are soluble in water. The water containing impurities is removed from the produced gas by condensing it, and therefore these impurities are still in the condensed water intended to be recycled. This water thus becomes increasingly contaminated with at least the abovementioned contaminants. These impurities, or at least some of them, may be injurious for reforming catalysts. It is therefore also necessary to purify this water before it is reinjected into the steam generation system.

Therefore, plants producing syngas and optionally steam for exportation conventionally include additional equipment intended for treating the water so as to be able to meet the purity requirements. Among such equipment are in particular the deaerators intended for eliminating the harmful water-soluble gaseous elements, the principle ones being oxygen, carbon dioxide and ammonia dissolved in water.

In a syngas generation unit, the dissolved $O_2$ comes in particular from the demineralized water and the dissolved $CO_2$ comes from the process condensates that are recycled thereinto, but there are also other impurities, and $NH_3$, $CH_3OH$ and organic acids sometimes dissolved in the process condensates. The deaeration operation is carried out by stripping the water to be treated countercurrently with clean steam.

Deaerators are known as such, and their operation will be briefly described below in conjunction with FIG. 1.

The dissolved gases are eliminated in strippers. These are in the form of small stripping columns (or domes) provided with trays or packing elements that are installed in the upper portion of the deaerator. The steam used for the stripping is conventionally generated in the deaerator itself, but it may also come from a source external to the deaerator.

The gas mixtures vented from the strippers are generally sent to atmosphere, which becomes polluted therewith. The impurities present in the water and entrained by the steam during stripping are discharged with the vented gas mixtures. Sending these impurities into the air is prejudicial—it is both disagreeable (odors), hazardous for persons passing nearby, and harmful to the environment.

SUMMARY OF THE INVENTION

Now, the Applicant has discovered that it is possible to use the actual syngas generation process to treat these vented gas mixtures and send them into the atmosphere with the flue gas emitted during syngas generation, the treatment consisting in injecting the vented gas mixture into the syngas generation unit itself, in certain heating and/or combustion zones. Depending on the location chosen for the injection, on the temperature at this point and on the impurities in question, either the impurity is diluted in the flue gas (for a temperature between 100° C. and 400° C., depending on the nature of the impurity in question) or it is decomposed (400° C. to 1000° C., depending on the nature of the impurity in question).

The venting line is understood to mean the line for discharging the gas mixture essentially consisting of the steam laden with impurities, produced by the stripper. In the context of the invention, this gas mixture is in general referred to as the vented gas mixture.

The invention thus helps to solve the pollution problem usually caused by the vented gas mixtures from the water deaerator(s) included in the steam production circuit(s) associated with a syngas production process.

The expression "associated syngas production process" is understood, in the context of the invention, to mean both a process for producing syngas by the steam reforming of a light hydrocarbon feedstock (SMR) and an autothermal reforming production process, it being understood, in the latter case, that the process also contains the step of preheating the feedstock prior to entry into the autothermal reformer itself.

Thus, the process according to the invention is a process $P_A$ for treating the vented gas mixture from a deaerator of a steam production process $P_B$ associated with a hydrocarbon-reforming syngas production process $P_C$, partly carried out in a reformer having a convection zone and a radiation zone and in which the heat is provided by the combustion of a fuel oil supplied via a low-pressure line in the presence of combustion air, said process $P_A$ comprising the following steps:
  a) supply of a steam production circuit with at least one stream of water; and
  b) stripping of dissolved gaseous impurities present in the water supplying step a) countercurrently with a stream of clean steam with production of at least:
    a stream of deaerated water and
      a vented gas mixture, i.e. a gas stream containing all or some of the gaseous impurities present in the water supplying step a),
in which all or part of the vented gas mixture coming from the stripping step b) is sent to at least one step of the process $P_C$ during which at least fluids are at a temperature T between 100° C. and 1000° C., in order to be mixed therein with at least one fluid chosen from said fluids,
characterized in that it is mixed therein with at least one gas stream of sufficiently low pressure for it to be not worthwhile compressing said recycled vented gas mixture before injection, said all or part of the vented gas mixture being recycled into the process $P_C$ in at least one location in the convection zone of the furnace and said gas stream of sufficiently low pressure being formed by the combustion flue gas.

The advantage of the process is all the greater when it is applied to the vented gas mixtures coming from a stripping column treating the process condensates that contain impurities that are undesirable in the atmosphere, in particular ammonia, generated in a steam reforming furnace when the treated hydrocarbon feedstock contains nitrogen, which may thus be either diluted or decomposed at a temperature between 400° C. and 1000° C.

When the syngas produced is treated in a shift reactor (i.e. when the syngas production process also includes a step of converting the raw syngas into $H_2$-enriched syngas according to the reaction $CO+H_2O \rightarrow CO_2+H_2$), methanol and organic acids are generated in the shift reactor. They are present in the process condensates, resulting from cooling the syngas produced, recycled into the deaerator and present in the vented gas mixture from the deaerator. Like the ammonia, they will be diluted and/or decomposed.

Advantageously, the water supplying step a) of the process comes entirely or partly from the associated syngas production process. However, the water may also come entirely or partly from sources external to said process.

Other points of injection may be used, injection into the low-pressure fuel oil line of said reactor of the process $P_C$ (whether close to the burners or not), into the radiation zone of said reactor of the process $P_C$, into the hearth or into the upper portion of the radiation chamber, or into the preheated or non-preheated combustion air circuit for the process $P_C$.

However, when ammonia is present in the flue gas, the injection of the vented gas mixture into the flue gas is a particularly advantageous variant of the process. Depending on the location of these injection points, the ammonia will either simply be diluted in the flue gas, or will contribute to NOx treatment of the type involving the non-catalytic selective reduction of the nitrogen oxides present in this same flue gas.

The reactions involved in the NOx process are the following:

$$2NO+4NH_3+2O_2 \rightarrow 3N_2+6H_2O$$

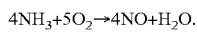

$$4NH_3+5O_2 \rightarrow 4NO+H_2O.$$

These two reactions take place simultaneously. Depending on the temperature at the point of ammonia injection, the NOx content of the flue gas may be minimized, with a residual $NH_3$ content, or else ammonia ($NH_3$) will be consumed, with production of NO. The point of injection of the vented gas mixture into the flue gas will be judiciously chosen so as to convert a maximum amount of ammonia, while still respecting the admissible NOx content in the flue gas vented to atmosphere (in the absence of selective catalytic reduction).

According to a variant of the invention, the process $P_C$ is an autothermal reforming process in which the hydrocarbon feedstock is preheated in a preheat furnace having a combustion zone and a convection zone before entering the autothermal reformer itself.

According to a second aspect of the present invention, this also relates to a plant for treatment of the vented gas mixture from a deaerator of a steam production process $P_B$ associated with a hydrocarbon-reforming syngas production process $P_C$, comprising at least:
  a reformer having:
    a convection zone,
    a radiation zone and
    means for supplying fuel oil, via a low-pressure line, and for supplying combustion air;
  a means for supplying a steam production circuit with at least one stream of water; and
  a deaerator for stripping dissolved gaseous impurities present in the water of said stream supplying step a) countercurrently with clean steam, with at least:
    a means for supplying a stream of water to be deaerated,
    a means for producing clean steam, suitable for stripping,
    a means for outputting a stream of deaerated water and
    a means for discharging the vented gas mixture,
characterized in that it also includes means for injecting all or part of the vented gas mixture coming from the deaerator into at least one location in the convection zone of the furnace of the plant.

This plant is advantageously capable of implementing the processes described above.

Preferably, said hydrocarbon-reforming syngas production unit comprises a steam reforming furnace.

According to another advantageous variant, the reforming unit comprises a preheat furnace in which the hydrocarbon feedstock intended for the reforming is heated prior to autothermal reforming, it is characterized in that said preheat furnace also includes means for injecting all or part of the vented gas mixture coming from the stripping stage into at least one location in the convection zone of the preheat furnace.

BRIEF DESCRIPTION OF THE FIGURES

The invention will be better understood with the aid of FIGS. 1 and 2, given by way of illustration but implying no limitation, in which:

FIG. 1 shows a diagram of a deaerator; and

FIG. 2 shows a diagram of a steam reformer in which the various points of injecting the vented gas mixture according to the invention are indicated.

DETAILED DESCRIPTION OF THE INVENTION

For a further understanding of the nature and objects for the present invention, reference should be made to the detailed description, taken in conjunction with the accompanying drawing, in which like elements are given the same or analogous reference numbers and wherein:

FIG. 1 shows a view of a conventional double-stripper deaerator capable of aerating two types of water. Usually, one stripper is dedicated for each type of water to be treated; however this is not obligatory, as the figure illustrates.

The deaerator comprises a tank 1 fitted with strippers 2 (here 2-*a*- and 2-*b*- for treating 2 types of water). These are in the form of small stripping columns (or domes) provided with trays or packing elements 3-*a*- and 3-*b*- that are fitted in the upper portion of the deaerator. The deaeration operation takes place by stripping of water 4-*a*- to be treated, generally coming from the syngas production process, and of water 4-*b*-, generally demineralized water, countercurrently with clean steam. The steam used for the stripping is either clean steam 5-*b*- (at approximately 100° C. and atmospheric pressure) or generated in the tank, which is provided with a heating system, from water 5-*a*- (process condensate return). Boiler water 6 stripped of the light impurities is recovered from the lower portion of the tank 1. The vented gas mixtures 7-*a*- and 7-*b*-, namely gas streams consisting of steam containing the stripped impurities, are recovered from the top of the strippers.

FIG. 2 illustrates a steam methane reformer (SMR) in which the various points of vented gas mixture injection are indicated. The reformer comprises a radiation chamber 11 and a convection chamber 12, the radiation chamber 11 comprising reforming tubes 13 placed at mid-distance between two refractory walls 14 supporting burners (not shown). The burners are supplied with fuel oil via a low-pressure fuel oil line 15 and with combustion air 16 which is preheated, by successive passages 17, in the convection chamber 12 to be heated by indirect heat exchange with the partially cooled flue gas. Apart from the combustion air, various fluids are commonly heated by passing them through the convection chamber—mention may for example be made of the boiler water at 18, the feedstock supplying the reformer, which passes several times through the flue gas with various levels of heat at 19, the superheated steam at 20, and the feedstock/steam mixture at 21 and at 22. These various fluid flows take place with flue gas temperatures between approximately 100° C. and 1000° C.

Various locations where vented gas mixtures are recycled are indicated in the figure by arrows accompanied with identifying letters (e.g., C, E, F, and G). Of course, it is possible to provide several vented gas mixture injections into the process, whether simultaneous or not.

The vented gas mixture recycling may be carried out at various levels in the convection zone. Depending on the location of these injections, the ammonia will either be simply diluted in the flue gas, at G or F, or will contribute to NOx treatment of the type comprising non-catalytic selective reduction of the nitrogen oxides present in this same flue gas, if it is injected at E.

The impurities are thus decomposed by the heat, without being burnt. This reincorporation of the impurities into the process has no impact on the reforming operation: it does not modify the combustion system—since the reincorporation is carried out downstream of the combustion—nor does it have any impact on the composition of the feedstock.

Example of "deNOx" by injecting the vented gas mixture into the convection chamber at a point of the type E.

Conditions: Steam reforming of a natural gas having a nitrogen content of 5% by volume. The $NH_3$ content in the vented gas mixture is between 2 and 5 kg/h, depending on the quality of the process condensate stripping.

Results relating to the NOx content in the flue gas after an NOx treatment using the vented gas mixture:

for vented gas mixture injection into the convection chamber at a location where the temperature is around 1040° C.: the resulting NOx content is from 120 to 150 ppm by weight in the flue gas;

for vented gas mixture injection into the convection chamber at a location where the temperature is around 880° C.: the resulting NOx content is from 30 to 60 ppm by weight in the flue gas.

It should also be pointed out that the impurities are decomposed by the heat, without being burnt. According to the process of the invention, this reincorporation of the impurities into the process has no impact on the reforming operation: it does not modify the combustion system—since the reincorporation is carried out downstream of the combustion—nor does it have any impact on the combustion of the feedstock.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process $P_A$ for treating a vented gas mixture from a deaerator of a steam production process $P_B$ associated with a hydrocarbon-reforming syngas production process $P_C$ partly carried out in a reformer having a convection zone and a radiation zone and in which the heat is provided by the combustion of a fuel oil supplied via a low-pressure line in the presence of combustion air, said process $P_A$ comprising the following steps:

a) supplying a steam production circuit with at least one stream of water;

b) stripping dissolved gaseous impurities present in the at least one stream of water countercurrently with a stream of clean steam, thereby producing at least:

a stream of deaerated water, and a vented gas mixture, wherein the vented gas mixture is a gas stream containing at least some of the gaseous impurities present in the at least one stream of water; and c) introducing at least a part of the vented gas mixture to the convection zone at an introduction location, wherein the introduction location is located at a point of the process $P_C$ during which fluids are at a temperature T between 100° C. and 1000° C., such that the vented gas mixture is mixed therein with at least one gas stream within the convection zone, wherein the at least one gas stream is of sufficiently low pressure, such that the method comprises an absence of compression of said vented gas mixture prior to step c), and wherein said gas stream of sufficiently low pressure comprises a combustion flue gas.

2. The process of claim 1, wherein the at least one stream of water supplying step a) comes at least partly from the associated syngas production process.

3. The process of claim 1, wherein the hydrocarbon-reforming syngas production process $P_C$ is a process for reforming a hydrocarbon feedstock in the presence of steam in a steam reforming furnace.

4. The process of claim 1, wherein the process $P_C$ is an autothermal reforming process in which the hydrocarbon feedstock is preheated in a preheat furnace having a combustion zone and a convection zone before entering the autothermal reformer.

5. A plant for treatment of a vented gas mixture from a deaerator of a steam production process $P_B$ associated with a hydrocarbon-reforming syngas production process $P_C$, the plant comprising:

a reformer configured to receive fuel oil via a low-pressure line and combustion air under condition effective to promote combustion of the fuel oil, the reformer having:
a convection zone, and
a radiation zone, a deaerator configured to strip dissolved gaseous impurities present in at least one stream of water countercurrently with a clean steam to produce the vented gas mixture, wherein the deaerator is in fluid communication with the convection zone such that at least a part of the vented gas mixture coming from the deaerator can be introduced into at least one location in the convection zone, such that the vented gas mixture can mix with a gas stream within the convection zone.

6. The plant of claim 5, wherein the hydrocarbon-reforming syngas production unit comprises a steam reforming furnace.

7. The plant of claim 5, wherein the reforming unit comprises a preheat furnace in which the hydrocarbon feedstock intended for the reforming is heated prior to autothermal reforming, wherein said preheat furnace is in fluid communication with the stripping stage and at least one location in the convection zone such that the plant is configured to inject all or part of the vented gas mixture coming from the stripping stage into at least one location in the convection zone of the preheat furnace.

8. The process of claim 1, further comprising the step of decomposing at least a portion of the gaseous impurities of the vented gas mixture within the convection zone, such that the level of gaseous impurities within the flue gas is decreased.

9. A process for utilizing a vented gas mixture from a deaerator associated with a syngas production trait comprising a reformer having a plurality of reformer tubes, a convection zone and a radiation chamber, the process comprising the steps of:

introducing a process condensate from the syngas production unit to the deaerator, the process condensate comprising water and dissolved impurities; separating dissolved impurities from the process condensate using the deaerator to form a vented gas mixture and boiler water, wherein the vented gas mixture comprises a substantial amount of the dissolved impurities; and introducing the vented gas mixture into a location of the reformer that is outside the reformer tubes.

10. The method as claimed in claim 9, wherein the dissolved impurities comprises a water soluble impurity selected from the group consisting of ammonia, methanol, formic acid, amines, and combinations thereof.

11. The method as claimed in claim 9, wherein the location the vented gas mixture is introduced into the reformer comprises more than one entry point.

12. The method as claimed in claim 9, wherein the location the vented gas mixture is introduced into the reformer is within the convection zone.

13. The method as claimed in claim 9, wherein the location the vented gas mixture is introduced into the reformer is within the radiation chamber.

14. The method as claimed in claim 9, wherein the location the vented gas mixture is introduced into the convection zone is proximal the radiation chamber, such that the dissolved impurities of the vented gas mixture decompose within the convection zone.

15. The method as claimed in claim 9, wherein the location the vented gas mixture is introduced into the reformer has a temperature between 400° C. and 1000° C., such that the dissolved impurities of the vented gas mixture decompose within the reformer.

16. The method as claimed in claim 9, wherein the location the vented gas mixture is introduced into the reformer has a temperature between 100° C. and 400° C., such that the dissolved impurities of the vented gas mixture are diluted within the convection zone.

17. The method as claimed in claim 9, wherein the location the vented gas mixture is introduced into the reformer is distal the radiation chamber, such that the dissolved impurities of the vented gas mixture are diluted within the convection zone.

18. The method as claimed in claim 9, further comprising the step of venting a flue gas from the reformer to the atmosphere, wherein the dissolved impurities comprises ammonia, wherein the location the vented gas mixture is introduced into the reformer is selected so as to convert a substantial amount of ammonia while keeping NOx content in the resulting flue gas below a threshold value.

* * * * *